(12) United States Patent
Kahtava et al.

(10) Patent No.: US 10,645,703 B2
(45) Date of Patent: May 5, 2020

(54) METHODS, INFRASTRUCTURE UNIT, BASE STATION AND NETWORK UNIT

(71) Applicant: SONY CORPORATION, Tokyo (JP)

(72) Inventors: Jussi Tapani Kahtava, Basingstoke (GB); Hideji Wakabayashi, Basingstoke (GB)

(73) Assignee: SONY CORPORATION, Tokyo (JP)

(*) Notice: Subject to any disclaimer, the term of this patent is extended or adjusted under 35 U.S.C. 154(b) by 67 days.

(21) Appl. No.: 15/533,442

(22) PCT Filed: Dec. 21, 2015

(86) PCT No.: PCT/EP2015/080753
§ 371 (c)(1),
(2) Date: Jun. 6, 2017

(87) PCT Pub. No.: WO2016/102441
PCT Pub. Date: Jun. 30, 2016

(65) Prior Publication Data
US 2017/0374669 A1    Dec. 28, 2017

(30) Foreign Application Priority Data

Dec. 23, 2014 (EP) .................................... 14200168

(51) Int. Cl.
*H04W 72/08* (2009.01)
*H04L 5/00* (2006.01)
(Continued)

(52) U.S. Cl.
CPC ......... *H04W 72/082* (2013.01); *H04L 5/0073* (2013.01); *H04L 5/0091* (2013.01);
(Continued)

(58) Field of Classification Search
CPC combination set(s) only.
See application file for complete search history.

(56) References Cited

U.S. PATENT DOCUMENTS

2011/0310747 A1* 12/2011 Seo ...................... H04B 7/2606
370/246
2013/0077506 A1    3/2013 Hu et al.
(Continued)

FOREIGN PATENT DOCUMENTS

WO    2011/019919 A1    2/2011
WO    2013/027014 A1    2/2013
(Continued)

OTHER PUBLICATIONS

"3$^{rd}$ Generation Partnership Project; Technical Specification Group Radio Access Network; Small cell enhancements for E-UTRA and E-UTRAN—Physical layer aspects (Release 12)," 3GPP TR 36.872 V12.0.0, 2013, (78 pages).
(Continued)

*Primary Examiner* — Zhitong Chen
(74) *Attorney, Agent, or Firm* — Xsensus LLP

(57) ABSTRACT

A method of reducing interference comprises estimating an interference level in a mobile network. In the event that the interference level is detected as being above a satisfactory threshold, the method comprises selecting an infrastructure unit of one or more infrastructure units which is currently operating as one of a base station or an uplink and downlink relay node configured to relay uplink and downlink transmissions, and configuring the infrastructure unit to operate as an uplink relay node such that it does not send downlink signals. In the event that the interference level is detected as being below a satisfactory threshold, the method comprises selecting an infrastructure unit currently operating as an uplink relay node such that it does not send downlink signals, and configuring the infrastructure unit to operate as one of a base station or an uplink and downlink relay node configured to relay uplink and downlink transmissions.

7 Claims, 8 Drawing Sheets

(51) Int. Cl.
*H04W 4/50* (2018.01)
*H04W 40/22* (2009.01)
*H04W 24/02* (2009.01)
*H04W 84/04* (2009.01)
*H04B 1/403* (2015.01)
*H04W 88/04* (2009.01)

(52) U.S. Cl.
CPC .............. *H04W 4/50* (2018.02); *H04W 40/22* (2013.01); *H04B 1/406* (2013.01); *H04W 24/02* (2013.01); *H04W 84/045* (2013.01); *H04W 84/047* (2013.01); *H04W 88/04* (2013.01)

(56) References Cited

U.S. PATENT DOCUMENTS

| | | | | |
|---|---|---|---|---|
| 2013/0172003 | A1* | 7/2013 | Chun | H04J 11/005 455/452.1 |
| 2013/0188552 | A1* | 7/2013 | Kazmi | H04L 5/001 370/315 |
| 2014/0133335 | A1* | 5/2014 | Morioka | H04W 40/08 370/252 |
| 2014/0161024 | A1 | 6/2014 | Speight et al. | |
| 2014/0226558 | A1 | 8/2014 | Speight et al. | |
| 2014/0355568 | A1* | 12/2014 | Gunnarsson | H04W 72/085 370/331 |
| 2015/0341937 | A1 | 11/2015 | Speight et al. | |
| 2016/0353426 | A1* | 12/2016 | Marupaduga | H04W 76/14 |

FOREIGN PATENT DOCUMENTS

| | | |
|---|---|---|
| WO | 2013/109172 A1 | 7/2013 |
| WO | 2015/180890 A2 | 12/2015 |
| WO | 2016/050401 A1 | 4/2016 |

OTHER PUBLICATIONS

Harri Holma, et al., "LTE for UMTS OF DMA and SC-FDMA Based Radio Access," John Wiley & Sons Limited, 2010, (4 pages).
International Search Report dated Mar. 2, 2016 in PCT/EP2015/080753 filed Dec. 21, 2015.

* cited by examiner

METHODS, INFRASTRUCTURE UNIT, BASE STATION AND NETWORK UNIT

The present application claims priority to European Patent Application 14 200 168.4, filed in the European Patent Office on 23 Dec. 2014, the entire contents of which is incorporated by reference.

TECHNICAL FIELD OF THE DISCLOSURE

The present disclosure relates to methods, infrastructure unit, base station and network unit and more broadly to communicating data in a small cell environment where relay nodes may be used.

BACKGROUND OF THE DISCLOSURE

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly.

The anticipated widespread deployment of third and fourth generation networks has led to the parallel development of a number of new infrastructure architectures involving a variety of class of devices, of wireless access point units and of applications which may be target to different data rates, coverage areas or transmission powers. Unlike a conventional third or fourth generation communications device such as a smartphone, an MTC-type terminal is preferably relatively simple and inexpensive, having a reduced capability. Examples of recent developments include so-called machine type communication (MTC) applications, which are typified by semi-autonomous or autonomous wireless communication devices (i.e. MTC devices) communicating small amounts of data on a relatively infrequent basis. Examples include so-called smart meters which, for example, are located in a customer's house and periodically transmit information back to a central MTC server data relating to the customers consumption of a utility such as gas, water, electricity and so on. Other examples include relay nodes which provide assistance to local terminal communicating with a base station.

Whilst it can be convenient to have different systems addressing different needs from different mobile network users, the additions of new infrastructure and new services can also create an infrastructure problem, which is not desirable in a mobile network.

SUMMARY OF THE DISCLOSURE

According to an example embodiment of the present technique there is provided a method of reducing interference in a mobile communications network, wherein the mobile network comprises one or more infrastructure units and one or more terminals, the infrastructure units being operable to send and/or receive wireless signals with the one or more terminals. The method comprises estimating an interference level in the mobile communication network. In the event that the interference level is detected as being above a satisfactory threshold: an infrastructure unit of the one or more infrastructure units is selected, which is currently operating as one of a base station or an uplink and downlink relay node configured to relay uplink and downlink transmissions and the infrastructure unit is configured to operate as an uplink relay node such that it does not send downlink signals. In the event that the interference level is detected as being below a satisfactory threshold, an infrastructure unit currently operating as an uplink relay node such that it does not send downlink signals is selected and the infrastructure unit is configured to operate as one of a base station or an uplink and downlink relay node configured to relay uplink and downlink transmissions.

According to another example embodiment of the present technique there is provided a network unit for reducing interference in a mobile communications network, wherein the mobile network comprises one or more infrastructure units and one or more terminals, the infrastructure units being operable to send and/or receive wireless signals with the one or more terminals and the network unit. The network unit is configured to: estimate an interference level in the mobile communication network; in the event that the interference level is detected as being above a satisfactory threshold: select an infrastructure unit of the one or more infrastructure units which is currently operating as one of a base station or an uplink and downlink relay node configured to relay uplink and downlink transmissions, and configure the infrastructure unit to operate as an uplink relay node such that it does not send downlink signals; and in the event that the interference level is detected as being below a satisfactory threshold: select an infrastructure unit currently operating as an uplink relay node such that it does not send downlink signals, and configure the infrastructure unit to operate as one of a base station or an uplink and downlink relay node configured to relay uplink and downlink transmissions.

According to a further example embodiment of the present technique there is provided a circuitry for a network unit for reducing interference in a mobile communications network, wherein the mobile network comprises one or more infrastructure units and one or more terminals, the infrastructure units being operable to send and/or receive wireless signals with the one or more terminals and the network unit. The circuitry comprises a controller element and a transceiver element configured to operate together to: estimate an interference level in the mobile communication network; in the event that the interference level is detected as being above a satisfactory threshold: select an infrastructure unit of the one or more infrastructure units which is currently operating as one of a base station or an uplink and downlink relay node configured to relay uplink and downlink transmissions, and configure the infrastructure unit to operate as an uplink relay node such that it does not send downlink signals; and in the event that the interference level is detected as being below a satisfactory threshold: select an infrastructure unit currently operating as an uplink relay node such that it does not send downlink signals, and configure the infrastructure unit to operate as one of a base station or an uplink and downlink relay node configured to relay uplink and downlink transmissions.

According to yet another example embodiment of the present technique there is provided a method of operating an infrastructure unit in a mobile communications network, wherein the mobile network comprises a base station and one or more terminals in communications with the base station. The method comprising the infrastructure unit: being configured not to send downlink signals to the one or more terminals; receiving an indicator of a first uplink resource grant for a first terminal of the one or more terminals; receiving first uplink signals sent by the first terminal to the base station, wherein the first uplink signals are sent via resources allocated via the first uplink resource grant; and transmitting relayed signals to the base station, wherein the relayed signals are based on the received first uplink signals.

According to a further example embodiment of the present technique there is provided an infrastructure unit in a mobile communications network, wherein the mobile network comprises a base station and one or more terminals. The infrastructure unit being configured to operate in an uplink relay mode, wherein, in the uplink relay mode the infrastructure unit is configured to: not send downlink signals to the one or more terminals; receive an indicator of a first uplink resource grant for a first terminal of the one or more terminals; receive first uplink signals sent by the first terminal to the base station, wherein the first uplink signals are sent via resources allocated via the first uplink resource grant; and transmit relayed signals to the base station, wherein the relayed signals are based on the received first uplink signals.

According to an additional example embodiment of the present technique there is provided circuitry for a infrastructure unit in a mobile communications system, wherein the circuitry comprises a controller element and a transceiver element configured to operate together to: not send downlink signals to the one or more terminals; receive an indicator of a first uplink resource grant for a first terminal of the one or more terminals; receive first uplink signals sent by the first terminal to the base station, wherein the first uplink signals are sent via resources allocated via the first uplink resource grant; and transmit relayed signals to the base station, wherein the relayed signals are based on the received first uplink signals.

According to another example embodiment of the present technique there is provided a method of operating a base station in a mobile communications network, wherein the mobile network comprises the base station, one or more terminals and a relay node configured to relay transmissions between the base station and a terminal of the one or more terminals. The method comprises the base station sending a first resource grant for the first terminal, the first resource grant allocating first uplink resources to the first terminal; sending first grant information to the relay node, the first grant information including an indication of the allocated first uplink resources for the first terminal; receiving first uplink signals via the allocated first uplink resources; receiving first relayed uplink signals transmitted by the relay node to the base station; and decoding uplink transmissions for the first terminal using the first uplink signals and the first relayed uplink signals.

According to a further example embodiment of the present technique there is provided a base station for use in a mobile communications network, wherein the mobile network comprises the base station, one or more terminals and a relay node configured to relay transmissions between the base station and a terminal of the one or more terminals, wherein the base station is configured to send a first resource grant for the first terminal, the first resource grant allocating first uplink resources to the first terminal; send first grant information to the relay node, the first grant information including an indication of the allocated first uplink resources for the first terminal; receive first uplink signals via the allocated first uplink resources; receive first relayed uplink signals transmitted by the relay node to the base station; and decode uplink transmissions for the first terminal using the first uplink signals and the first relayed uplink signals.

According to yet another example embodiment of the present technique there is provided circuitry for a base station for use in a mobile communications network, wherein the mobile network comprises the base station, one or more terminals and a relay node configured to relay transmissions between the base station and a terminal of the one or more terminals, wherein the circuitry comprises a controller element and a transceiver element configured to operate together to send a first resource grant for the first terminal, the first resource grant allocating first uplink resources to the first terminal; send first grant information to the relay node, the first grant information including an indication of the allocated first uplink resources for the first terminal; receive first uplink signals via the allocated first uplink resources; receive first relayed uplink signals transmitted by the relay node to the base station; and decode uplink transmissions for the first terminal using the first uplink signals and the first relayed uplink signals.

Accordingly, the embodiments of the present technique can provide an arrangement where an infrastructure unit can operate to assist with uplink transmissions, without sending any downlink signals, thereby increasing the network capacity while reducing the level of downlink interference in a mobile network. Such an arrangement or mode of operation can be activated dynamically depending on the level of interference experienced in the network.

In particular, there has been provided a method of reducing interference in a mobile communications network, wherein the mobile network comprises one or more infrastructure units and one or more terminals, the infrastructure units being operable to send and/or receive wireless signals with the one or more terminals. The method comprises estimating an interference level in the mobile communication network. The method comprises, in the event that the interference level is detected as being below a satisfaction level: selecting an infrastructure unit of the one or more infrastructure units which is currently operating as one of a base station or an uplink and downlink relay node configured to relay uplink and downlink transmissions, and configuring the infrastructure unit to operate as an uplink relay node; and in the event that the interference level is detected as being above a satisfaction level: selecting an infrastructure unit currently operating as an uplink relay node, and configuring the infrastructure unit to operate as one of a base station or an uplink and downlink relay node configured to relay uplink and downlink transmissions.

Various further aspects and features of the present technique are defined in the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DESCRIPTION OF EXAMPLE EMBODIMENTS

Figure 1:
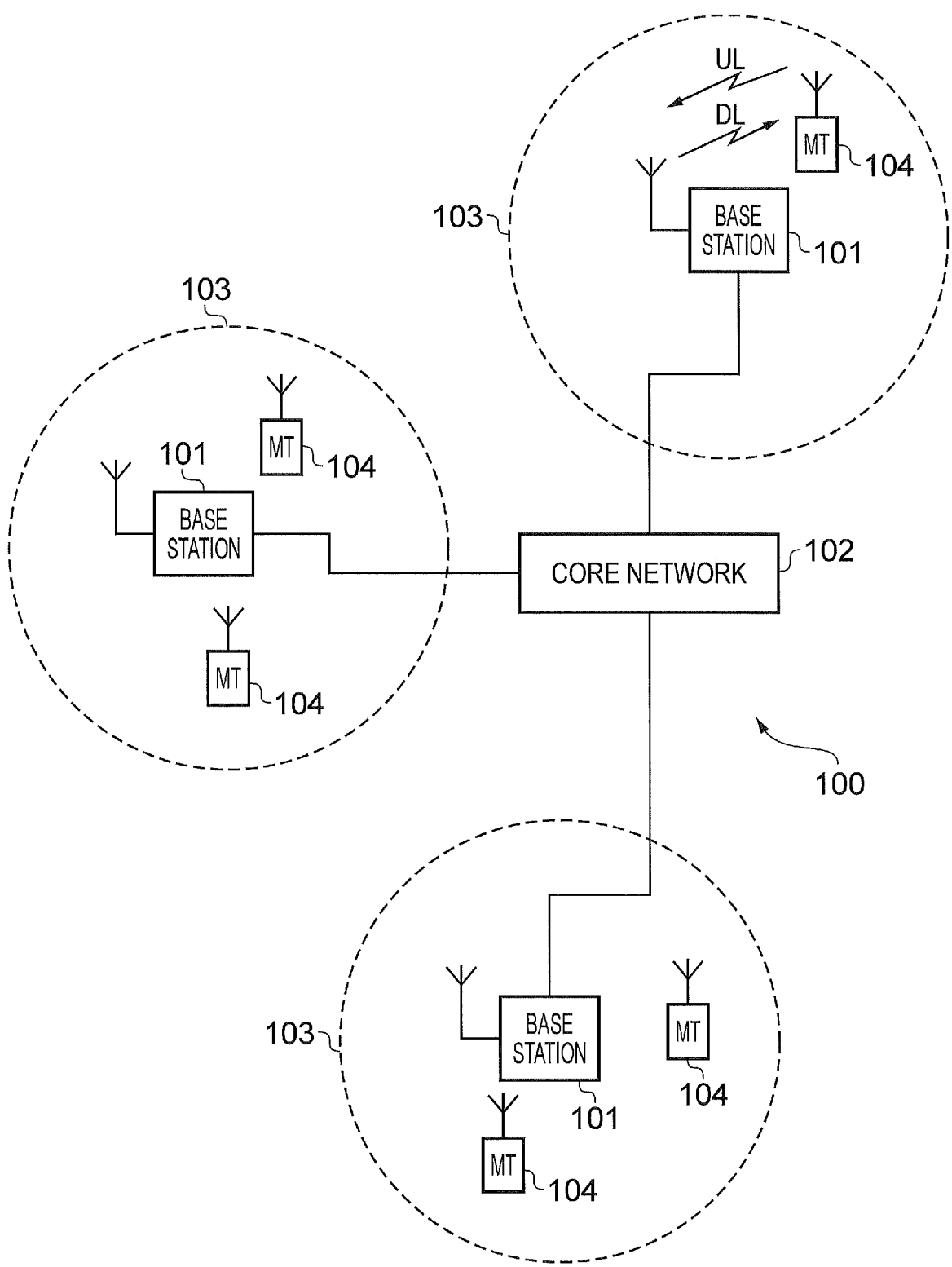
FIG. 1 provides a schematic diagram of a mobile communications system according to an example of an LTE standard.

Hereinafter preferred embodiments of the present technique will be described in detail with reference to the appended drawings. Note that, in this specification and appended drawings, structural elements that have substantially the same function and structure are denoted with the same reference numerals, and repeated explanation of these structural elements is omitted.

FIG. 1 provides a schematic diagram illustrating some basic functionality of a conventional mobile telecommunications network, using for example a 3GPP defined UMTS and/or Long Term Evolution (LTE) architecture. The mobile telecommunications network/system 100 of FIG. 1 operates in accordance with LTE principles and which may be adapted to implement embodiments of the disclosure as described further below. Various elements of FIG. 1 and their respective modes of operation are well-known and defined in the relevant standards administered by the 3GPP® body, and also described in many books on the subject, for example, Holma H. and Toskala A [1]. It will be appreciated that operational aspects of the telecommunications network which are not specifically described below may be implemented in accordance with any known techniques, for example according to the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The uplink and downlink communications are made using radio resources that are licensed for use by the operator of the network 100. The core network 102 routes data to and from the terminal devices 104 via the respective base stations 101 and provides functions such as authentication, mobility management, charging and so on. Terminal devices may also be referred to as mobile stations, user equipment (UE), user terminal, mobile terminal, mobile device, terminal, mobile radio, and so forth. Base stations may also be referred to as transceiver stations/nodeBs/e-nodeBs/eNodeB, and so forth.

Mobile telecommunications systems such as those arranged in accordance with the 3GPP defined Long Term Evolution (LTE) architecture use an orthogonal frequency division multiplex (OFDM) based interface for the radio downlink (so-called OFDMA) and the radio uplink (so-called SC-FDMA).

The base stations 101 of FIG. 1 may be realised as any type of evolved Node B (eNodeB) such as a macro eNodeB and a small eNodeB. The small eNodeB may be an eNodeB such as a pico eNodeB, a micro eNodeB, and a home (femto) eNodeB that covers a cell smaller than a macro cell. Instead, the base station 101 may be realized as any other types of base stations such as a NodeB and a base transceiver station (BTS). The base station 101 may include a main body (that is also referred to as a base station apparatus) configured to control radio communication, and one or more remote radio heads (RRH) disposed in a different place from the main body. In addition, various types of terminals, which will be described below, may each operate as the base station 101 by temporarily or semi-persistently executing a base station function.

Any of the communications devices 104 may be realized as a mobile terminal such as a smartphone, a tablet personal computer (PC), a notebook PC, a portable game terminal, a portable/dongle type mobile router, and a digital camera, or an in-vehicle terminal such as a car navigation apparatus. The communications device 104 may also be realized as a terminal (that is also referred to as a machine type communication (MTC) terminal) that performs machine-to-machine (M2M) communication. Furthermore, the terminal apparatus 104 may be a radio communication module (such as an integrated circuit module including a single die) mounted on each of the terminals In the present disclosure, a base station providing a small cell is generally differentiated from a conventional base station mostly (and sometimes exclusively) in the range provided by the base station. Small cells include for example the cells also called femtocell, picocell or microcell. In other words, small cells can be considered as similar to macrocells in the channels and features provided to the terminals, but with the use of less power for base station transmissions, which results in a smaller range. A small can therefore be the cell or coverage provided by a small cell base station. In other examples, the term small cell can also refer to a component carrier when more than one component carrier are available.

Figure 2:
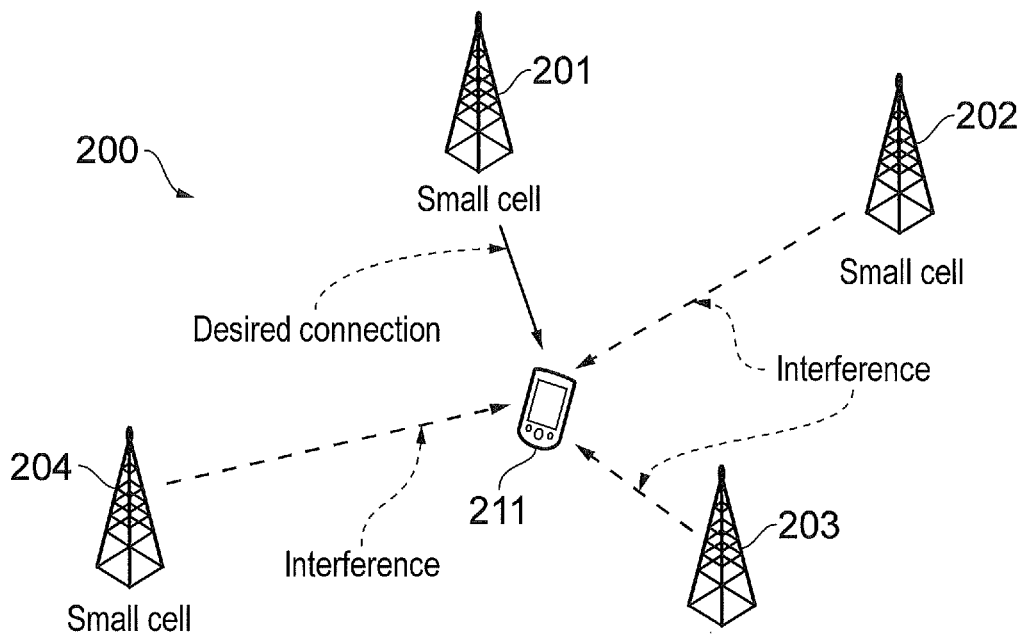
FIG. 2 schematically illustrates an example of a small cell environment.

FIG. 2 illustrates an example of a small cell environment 200 wherein a plurality of base stations 201-205 are operable to communicate with terminals, such as terminal 211. In this example, the terminal 211 is in communication with base station 201 providing a first small cell but is within the range of the small cell for each of base stations 202, 203 and 204. As a result, the signals sent by base station 201 to terminal 211 can suffer for interference from signals transmitted by base stations 202-204. While with conventional macrocell networks the same type of situation would also be likely, in practice, the mobile operator is in a position to carry out frequency planning, distributing frequencies amongst base stations in a static or dynamic manner. Accordingly, the level of interference can be significantly reduced for macrocells. On the other hand, when dealing with a small cell network, there may be a potentially very large number of base stations, each using different powers such that network planning becomes much more difficult, and the complexity also increases with the number of active small cells in an area. In particular, if a large number or small cells are available in an area, it is likely that they will not be able to each be allocated a different, non-overlapping frequency bands such that transmissions from different cells would not interfere with each other. Moreover, small cell networks have the additional difficulty that a small cell may be mobile, i.e. not stationary, while network planning for a macrocell or legacy femto/picocells was generally based on stationary or fixed base stations. This also increases the complexity of trying to reduce interference significantly. Of course, interference between small cells can be significant when the number of deployed small cells increases such that in a dense small cell environment, interference reduction is a challenging problem to address. As a knock-on effect, in the event that the interference affect synchronization signals or reference signals of small cells, terminals may not even be able to discover and connect to small cells.

Figure 3:
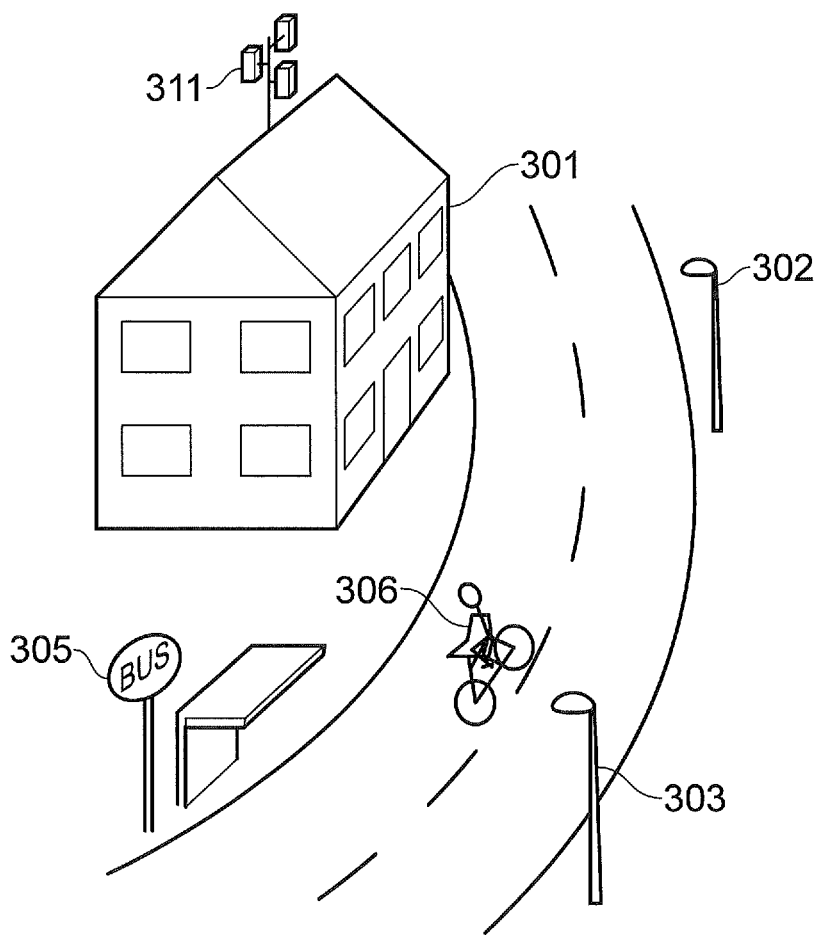
FIG. 3 illustrates another example of a small cell environment.

An example of a small cell environment is illustrated in FIG. 3, where a macrocell base station 311 is provided in the same area as small cells provided by a base station 301 in or in the vicinity of a building, by a base station 302 in a first lamppost, by a base station 303 in a second lamppost, by a base station 305 provided in a bus stop and by a mobile base station 306 provided in a cyclist back-pack. In this example, the planning for interference may vary depending on traffic and on time: the cyclist may enter an interference zone and later leave this are, while the base station 301, if associated with an office, may potentially only be used during office hours and may be turned off during the rest of the day or the rest of the week. A variety of base stations may thus be providing a small or macro cell and the base station may have very different profile regarding time of use, frequency capabilities, power/range, additional functionalities, etc.

Figure 4:
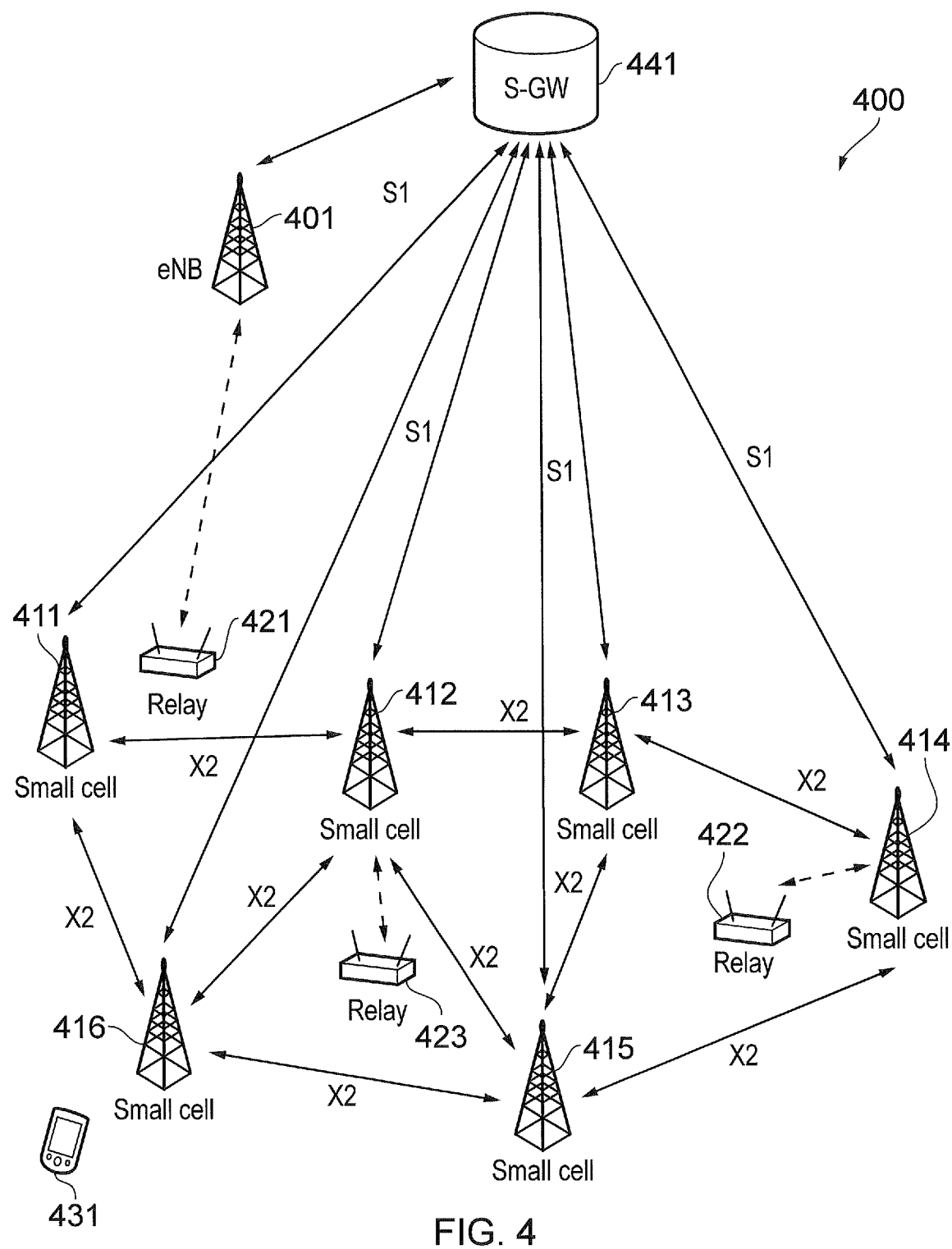
FIG. 4 illustrate an example system for communicating with at least a terminal in an heterogeneous network.

Moreover, mobile networks can also include Relay Nodes (RN) which can further increase the complexity of the mobile system and of the reduction of interference in a small cell network. FIG. 4 illustrate an example system 400 for communicating with at least a terminal 431. In this system 400, a base station 401 provides a macrocell and six base stations 411-416 provide small cell coverage, potentially overlapping with the coverage of the base station 401. Additionally, three RN 421-423 are provided and are operating with base stations 401, 414 and 412, respectively. A relay node can generally be defined as a wireless radio access point for relaying transmission and which thus does not implement all of the functionalities of a base station. It is in general not directly connected to the core network but uses wireless access (inband or outband) for backhaul link to connect with a base station. In other examples, the backhaul link may also be provided over a wired connection. This is in contrast to a small cell base station which, as mentioned above, can generally operate like a base station and is thus connected to the core network, as illustrated by the arrows between the small cell base stations 411-416 and the Serving Gateway "S-GW" in FIG. 4. Relay nodes may also send or receive data with the terminals or base stations which can also add to the complexity of dealing with interference in an environment as illustrated in FIG. 4.

Relay technologies are known generally to provide an arrangement for receiving signals from a base station and for retransmitting the received signals to a UE in a mobile communications network, or to receive signals transmitted from a UE for re-transmission to a base station of a mobile communications network. The aim of such relay nodes is to try to extend a radio coverage area provided by a mobile communications network to reach communications devices which would otherwise be out of range of the mobile communications network or to improve the ratio of successful transmissions between a terminal and a base station.

As disclosed in co-pending European patent application EP14170122.7 (the content of which are incorporated herein by reference), a multi-RAT uplink relay assisted transmission arrangement can be provided in which a relay node is used to assist a UE in relaying uplink transmission by receiving signals sent by the UE to the relay node and by re-transmitting the signals to a base station. In this context and in most relaying cases, the relay node is pre-configured for co-operating with the base station.

A variety of options for reducing interference in a small cell environment have been considered. As for a macrocell or conventional networks, small cell downlink power control may be used for example by adapting a small cell transmission power, wherein both the common channel power and data channel power may be adjusted. In this context, downlink power enhancement can be designed in a cell-specific way or a terminal-specific way. Likewise, frequency domain power control and the use of almost blank sub-frames (ABS) may be implemented with a view to reducing interference. An example of the frequency domain power control is base station Relative Narrowband TX Power restrictions (RNTP). Since Releases 8 and 9, a frequency-domain interference coordination scheme called ICIC (or e-ICIC in more recent releases) has been provided with a view to reducing inter-cell interference in co-channel deployment scenarios. This is done by exchanging power restriction (RNTP) at the level of the Physical Resource Block (PRB) or by the use of ABS for a dominant interferer.

Load shifting or balancing may also be considered when attempting to reduce interference, with a view to improving the overall system performance by changing the traffic load distribution over available cells and/or layers. Load shifting not only attempts to obtain a traffic load distributed more evenly and but also can attempt to concentrate the traffic into fewer cells in order to mitigate inter-cell interference. Synchronisation of small cell may also be used, wherein a target cell stops its own transmissions to listen to synchronization signals from one or multiple other cells. This may however be difficult to implement in certain propagation conditions and a long interval may be needed for finding the synchronization information.

Another option is the use of Coordinated Multi-Point Transmission (CoMP) where the small cells are all synchronised to facilitate coordinated transmission in downlink and joint reception in uplink. CoMP therefore assumes an ideal backhaul where there is hardly any latency between the sites coordinating in transmission and reception. Signals can then be received at multiple cell sites and be jointly processed for enhanced reception performance. This joint detection would take place in the centrally coordinated hub overlooking all the other nodes/antennas. This is however unsuitable to for example mobile small cells or to dynamically changing small cells due to the very strict synchronisation expectations and re-configuration required.

As the skilled person would understand, all of these methods have their limitations. For example, using less power results in a smaller coverage area and may in some cases not be sufficient to avoid the interference. Also, in a dense small cell deployment, there may not be a single dominant interference source such that the use of frequency domain power control and/or ABS may have significantly less effect than in a conventional network.

Another attempt to address this interference problem with small cell dense networks is the small cell on/off mechanism that has been discussed in TR 36.872 [2]. Small cell on/off adaptation refers to the turning on and off of a small cell depending on specific circumstances. When the small cell is turned on, it acts as a base station and may transmit any signals provided by a base station necessary for data transmission, such as reference signals used for measurements and demodulation. Any terminal may synchronise to and access the small cell and may receive data transmission from the cell. When the small cell is turned off, it does not transmit any synchronization signals or signals necessary for data transmission, and terminals may not access the small cell and may not receive data transmission from the cell. According to this mechanism, a small cell can be turned on or off looking at large time scales, in a semi-static manner, looking at the subframe level or to be used as an SCell for carrier aggregation with reduced cell-specific reference signal (CRS). While this reduces the interference that will occur in a small cell network, this also of course results in a reduced service for the terminals as fewer small cells are activated in the case of interference.

It is therefore desirable to provide another mechanism when trying to reduce interference in a small cell environment.

Figure 5:
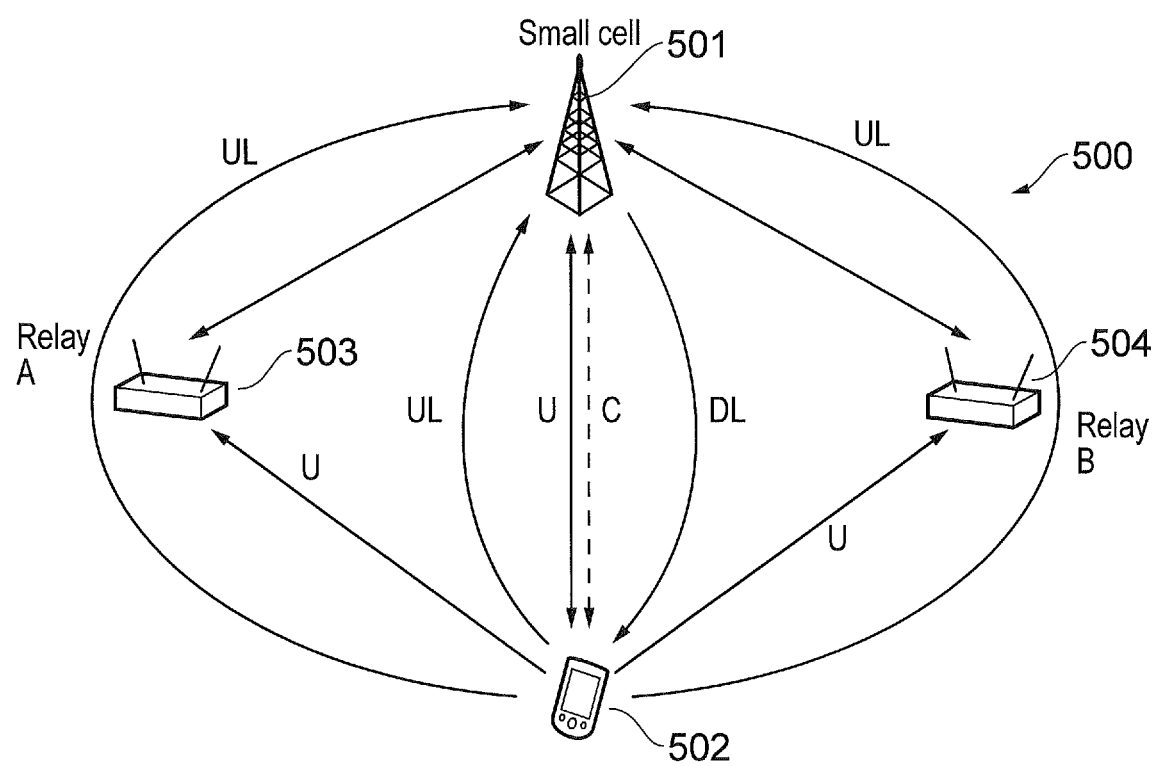
FIG. 5 illustrates an example communications system in accordance with an aspect of the present disclosure.

According to an arrangement of the present disclosure, there is provided a relay node that is configured to operate in uplink only and to not transmit downlink data, so as to avoid creating downlink data while making use of the RN to provide additional uplink capacity. FIG. 5 illustrates an example system 500 including two RN 503-504 operating in uplink mode only. The system 500 comprises a base station 501 (e.g. a small cell base station) and a terminal 502 connected to the base station 501. As the terminal 502 is connected to this base station 501, they can exchange user-plane messages (see "U" in FIG. 5) and control-plane messages (see "C" in FIG. 5). User-plane messages include downlink messages "DL" and uplink messages "UL". Overall, the communications between the terminal 502 and the base station 501 can be conventional. Additionally, the RN 503 and 504 operate in uplink mode only. As relay node, they are not connected to the terminal 502 as such, thus they only exchange user-plane messages with the terminal 502. Moreover, as they are operating in UL-only mode, the UL messages can be sent to the base station 501 via each of RN 503 and RN 504, however the DL messages will not be communicated via the relay nodes 503-504.

Accordingly, owing to the use of one or more relay nodes operating in an uplink-only mode, the relay node does not aggravate the interference situation while increasing the uplink capacity and potentially coverage. For example, if the terminal has a low power transmitter, the relay node may facilitate communication with the base station 501 in the uplink, while downlink communications may not suffer from such a limitation on the transmission power.

Figure 6:
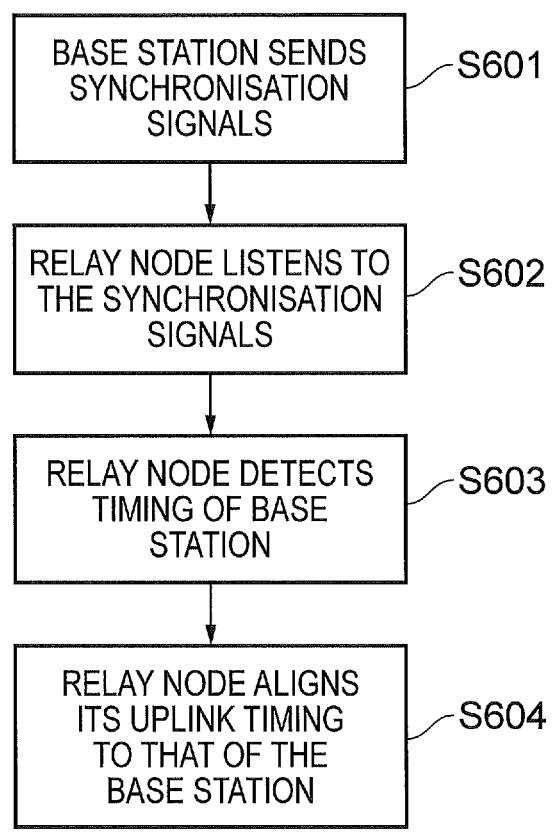
FIG. 6 illustrates a method in accordance with an aspect of the present disclosure.

FIG. 6 illustrates a method in accordance with the present disclosure. At step S601, the base station sends synchronisation signals. Such signals may for example be used by terminals to synchronise and connect to the base station. Then at step S602, the RN receives the synchronisation signals sent by the base station. At S603, the relay uses the synchronisation signals to detect the timing of the base station and it then aligns its uplink timing to that of the base station (S604). The relay can then send uplink data to the base station in a synchronised manner.

Figure 7:
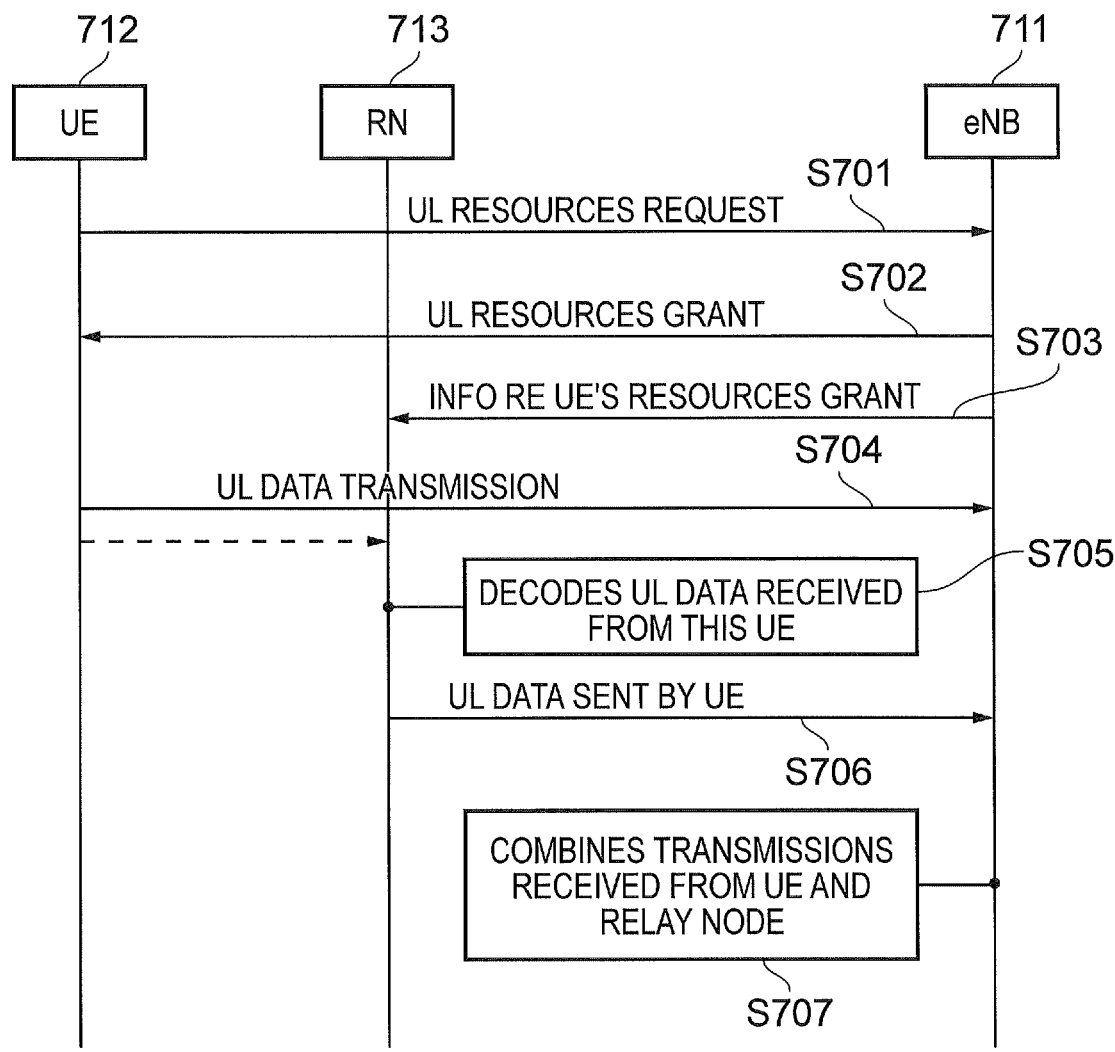
FIG. 7 illustrates shows ladder diagram corresponding to a method in accordance with an aspect of the present disclosure.

FIG. 7 shows ladder diagram for an example method in accordance with the present disclosure. In this example, it is assumed that the base station 711 and terminal 712 are connected and that the RN 713 is connected to the base station and synchronised with the base station 711. At step S701, the terminal requests UL resources to the base station, to which the base station 711 responds with an UL resources grant (S702). Signals from the source to the destination are illustrated with a plain arrow while the dashed arrows represent signals received by other elements. For example the RN 713 receives the UL resources request at S701 and the UL resources grant at S702 even though the signals are not intended to the RN 713 but to the base station 711 and terminal 712, respectively. When the base station 711 receives the request for UL resources at S701, it sends to the RN 713 information regarding the UL resources allocated to the terminal 7112 at S702. The base station can for example indicate which resources the terminal will use to send uplink resources and, if appropriate or desired, one more identifiers for the terminal (e.g. a type of RNTI). The base station can for example oversee the use of relays within its coverage so as to optimise the use of resources and the capacity provided by the network. It can thus know that the terminal 712 is or is likely to be within coverage of RN 713 and thus sends the grant information to this relay node 713. Although only one relay node has been represented in FIG. 7, in accordance with the present disclosure, more than one relay nodes may be involved and, if appropriate, the base station may send grant information to two or more relay nodes.

Then, once the terminal 712 sends the UL data to the base station 711 (S704), the RN 713 is already aware of which resources will be used for sending this data and it can decode the UL data received from this terminal 712 (S705). The RN 713 can then forward the UL data to the base station 711 (S706) which can then combine the UL data received from the terminal 711 (S704) and from the RN 713 (S706) at step S707. Accordingly, uplink coverage can be improved while avoiding causing any interference on the downlink. It is noteworthy that the method illustrated in FIG. 7 can be carried out with the RN passively listening to the communications from the terminal and does not require a connection or wireless interface set up with the terminal for sending signals specifically to the RN. In other words, the terminal 712 may not even be aware of the presence of the RN 713 and that RN 713 is providing uplink assistance The base station 711 can combine the data in any appropriate manner, for example in the digital or analogue domain. For example, the base station may be configured to combine UL transmissions by adding the soft bits (in a manner similar to that of soft-combining in HARQ) or it may be configured to digitally combine the transmissions. The latter may involve processing such as data recovery and error correction if one or both of the transmissions have been received at least partially corrupted. By receiving the transmission twice, the base station is more likely to receive the data safely without having to request retransmissions, which will also reduce the traffic in the cell (e.g. small cell) of the base station. When combining the data, there may be a delay between the data received at S704 and the data received at S706, the base station may thus make use of a buffer or any other memory means for temporarily storing the first transmission received at S704 for combining with the second transmission. As the base station is aware that RN 713 is listening to UL signals from the terminal 712, the base station can determine to which uplink signals (and thus to which terminal) sent by the relay relate and thus to combine corresponding communications. Optionally, the base station 711 may, with the information sent at S703, allocate uplink resources for the RN 713 to send the data based on the terminal's UL data. For example, once the base station 711 receives a request for uplink resources, the base station can determine if any relay node can assist with uplink transmissions and send to the relevant relay node(s) the information regarding the UL resources allocated for the terminal and the UL allocated for the relay node assisting with UL transmissions. Then, based on the resources used by the relay node 713 to send the data at S706, the base station automatically identify to which terminal and UL transmissions they relate. Additionally or alternatively, the base station 711 may also send an identifier that the relay node can use to identify that its data (e.g. sent at step S706) relates to specific UL transmissions from a terminal (e.g. sent at step S704).

Additionally, in accordance with the present disclosure, an uplink and downlink relay node (i.e. configured to assist with downlink and uplink transmissions) or a base station and in particular a small cell base station-may be re-configured to operate as an uplink only relay node with a view to reducing the interference potentially caused by the base station. The network could for example detect a level of interference above an acceptable threshold and/or may detect that deactivating the relay node or base station would improve the throughput throughout the area. Rather than fully deactivating the small cell base station or relay node, the base station may be reconfigured to work as a relay node and for UL transmissions only.

Figure 8:
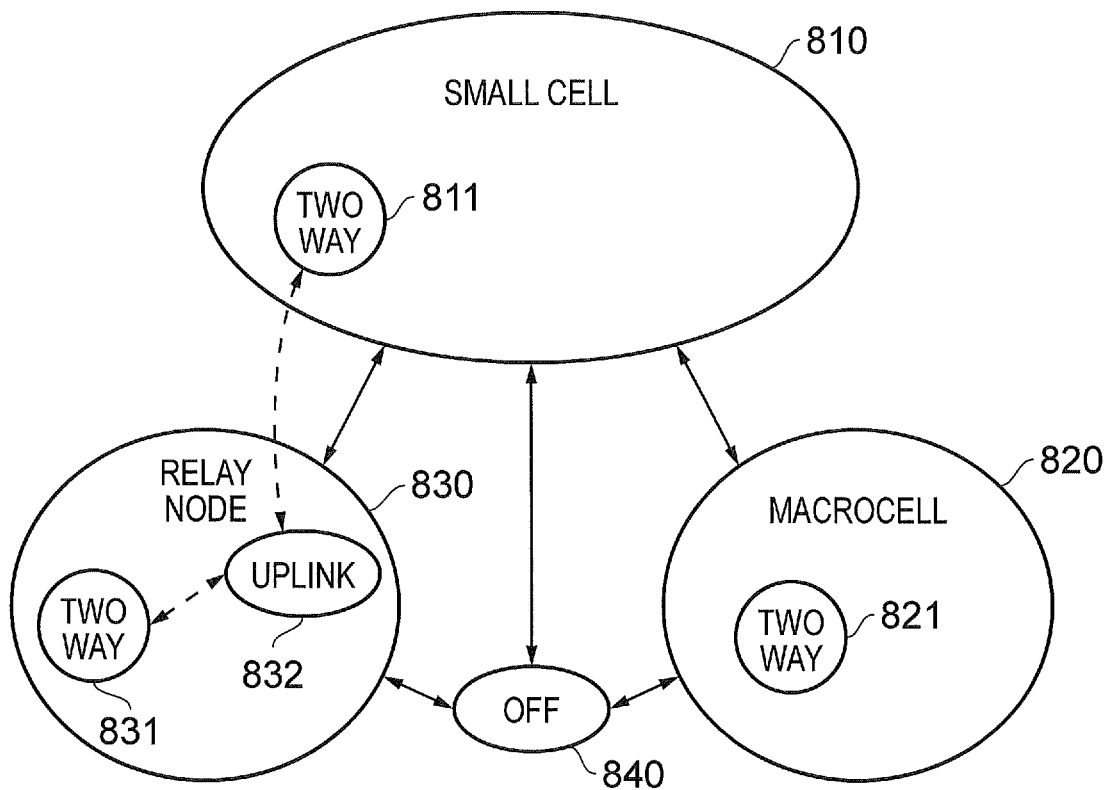
FIG. 8 illustrates possible states for a wireless access point in a mobile network and in accordance with an aspect of the present disclosure.

FIG. 8 illustrates an example of possible states for a wireless access point in a mobile network in accordance with the present disclosure. The expression "wireless access point" is intended to cover any type of base station or relay node, i.e. any infrastructure unit configured to receive and/or send signals from/to one or more terminals in a mobile network. In the conventional mode of operation, the base station is configured as a macrocell 820 which includes a two-way mode 821 for both uplink and downlink. As the base station provides connectivity to terminals, the base station will generally operate in both UL and DL. Other modes or sub-modes may also be provided (such as a carrier aggregation mode). Likewise, the small cell mode 810 includes a two way mode 811 similar to mode 821. A relay node mode 830 is also provided which includes a two way mode 831 and an UL-only mode 832. An off mode 840 may also be provided. While FIG. 8 shows example modes, and transitions between modes, some base stations or RN may only implement some of these modes and/or additional modes not represented on FIG. 8. For example, a RN may only implement modes 830, including mode 831 only, and mode 840. A base station may only implement modes 810 and 820, wherein the transition between the two modes could consist in a change of transmission power. According to the present disclosure, the uplink only mode 832 is now available which enables an equipment to passively listen to UL signals and forward the UL data to the relevant base station. Additionally, a base station, and in particular a small cell base station can be re-configured to operate in the UL-only mode 832, thereby no longer operating as a base station or a two-way relay node may be re-configured to operate in this UL-only mode 832. These transitions of particular interest have been illustrated in FIG. 8 with the dashed arrows. The arrows are double-ended as it may be decided that a base station or RN may no longer be required to operate in UL-only mode and may be re-activated to operate in a conventional two-way mode 811 or 831, respectively, or in any other appropriate mode.

When a base station operates in one of modes 811 or 821 and is being re-configured as an uplink relay node (mode 832), this infrastructure unit will be re-configured so that it no longer operates as a base station and now operates as an uplink relay node. For example, this may involve the infrastructure unit de-registering or being de-registered with the S-GW (see for example S-GW 441 in FIG. 4) and, more generally, with the core network of the mobile network. This may also involve the infrastructure unit registering itself as a relay node (e.g. uplink-only relay node) with a base station (e.g. still operating in mode 821 or 811) and, optionally, with other relay nodes if relay nodes can also be connected or registered with one or more other relay nodes.

Likewise, if an infrastructure unit operating as an uplink-only relay node is reconfigured as a base station, the inverse registration and de-registration processes may take place: the unit may de-register or be de-registered as a relay node with the base station and any other relay nodes, if appropriate, and may be register or be registered with the S-GW and the core network so that it can operate as a base station.

Figure 9:
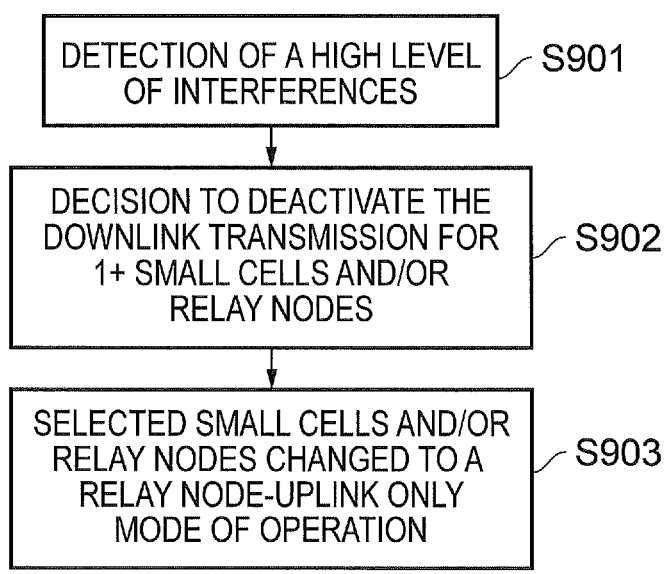
FIG. 9 illustrates an example method in accordance with the present invention.

FIG. 9 illustrates an example method in accordance with the present invention. At step S901, a detection is made of a high level of interference. For example, any element monitoring the quality of the wireless links in the networks (e.g. using link quality reports from terminals or base stations) may identify that the network is currently experience a high level of interference. Following this detection, a decision can be made to deactivate downlink transmissions for one or more small cell base stations and/or relay nodes (S902) with a view to reducing the amount of interference experienced in the network. Another aspect that may be taken into consideration when deciding whether to take action and/or which base station or relay node to reconfigure is the number of UEs served by the base station or relay node. For example, if the number of UEs served does not warrant the downlink interference caused by the base station or relay node, then it may be decided to reconfigure the infrastructure unit as an uplink only relay node. Then, as S903, the base stations and/or relay nodes selected at S902 are re-configured to operate in an UL-only mode of operation. Although not illustrated, the method may also comprise detecting that the level of interference has now become acceptable and activating one or more base stations and/or relay node to no longer be in the UL-only mode.

It is noteworthy that compared to existing arrangements, the relay node does not operate on the premise that it has a connection, or at least a wireless interface, set up with the terminal, but the relay node is instead configured to operate passively. In other words, the relay node merely passively listens to the uplink transmissions for the connection between one or more terminals and a base station and forwards the transmissions to the base station.

Figure 10:
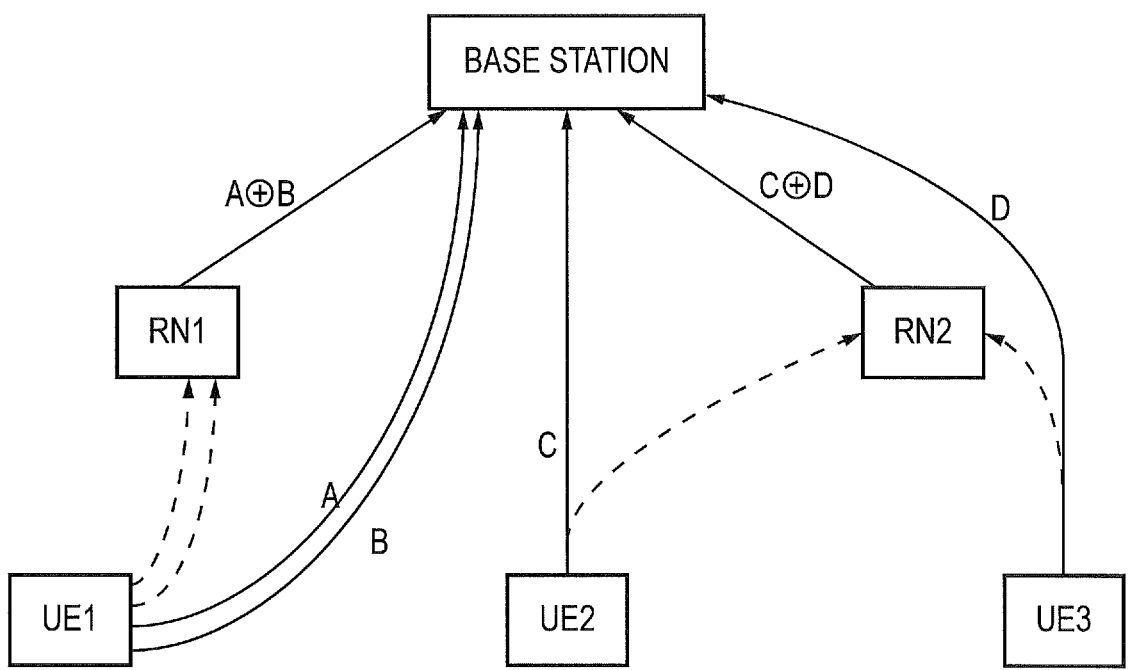
FIG. 10 illustrates an example of network coding combining at a base station in accordance with one or more aspects of the present disclosure.

In some examples, the relay node may forward the transmissions ("A") sent by the terminal directly to the base station without any substantial modification, although re-encapsulating of part of the transmission may be applied in some cases, for example so that the UL data can be sent from the relay node to the base station in accordance with a pre-defined standard. In other examples, the relay node may forward the transmissions ("A") received from the terminal after it has been processed based on a second transmissions ("B") received from the same or from a different terminal. For example, the relay node, instead of transmitting A and B separately, may transmit "A XOR B" (sometimes also written "A⊕B"). This can be useful in cases where the relay offers its assistance for uplink communications in cases where the terminals have enough power to send UL data to the base station but where the base station is at the edge of the terminals' range. In this case, the base station can receive A and B individually from the terminal or terminals and can then combine A and A⊕B to obtain or confirm B and combine B and A⊕B to obtain or confirm A. This type of combining transmissions using a XOR combination of at least two transmissions is sometimes referred to as Network Coding (NC) and is illustrated in FIG. 10 in the context of uplink relay nodes. This figure illustrates two examples. In the first example, UE1 transmits A and B on the uplink and the relay node transmits A⊕B to the base station so that the base station is more likely to decode A successfully by using or combining A on one side and B and (A⊕B) on the other side, owing to the relation "(A⊕B)⊕B=A" and to decode B successfully using or combining B on one hand and (A⊕B) on the other hand, owing to the relation "(A⊕B)⊕A=B". Accordingly, the same effect can be achieved as with individual and separate retransmissions of A and B, but using less uplink capacity from the relay node part. The same principle can be used for transmissions from more than one terminals, as illustrated with UE2 and UE3 of FIG. 10 which transmit C and D, respectively, and with the relay node transmitting C⊕D to the base station. When using network coding, the combining can also be done in the analogue domain or in the digital domain as mentioned above in respect of conventional combining of signals. It is noteworthy that in the event that one of UE2 is relatively far to the base compared to UE3, then the transmission of C is less likely to reach the base station with sufficient quality and integrity than that of D from UE3. On the other hand, the relay node, if closer to UE2 than the base station can receive the transmission of C with a relatively good quality compared to the base station. Therefore, even if in fact the transmission of C has not reached the base station, or with a poor quality, the base station can still obtain C by using D from UE3 and C⊕D from the relay node.

As mentioned in respect of FIG. 7, as the base station is aware that a terminal will send data A and the same or a further terminal will send data B, the base station can allocate uplink resources for the relay node to either send separately data based on A and data based on B or uplink resources for sending a combination of A and B, for example A⊕B. As the base station is sending the uplink resources grant message(s) to the uplink-only relay node, it is aware of which data from the relay node corresponds to which data from the terminal and is thus able to process then accordingly.

For the combining and/or prior processing of the signals at the base station, the operations can be carried out in the digital and/or analogue domain. For example, in the analogue domain, the base station can apply a "XOR" operation to two analogue signals as received (for example using an analogue XOR gate), such as B and (A⊕B) in one of the examples above. In another example, the base station can process the signals and convert them into the digital domain to then apply a logical/digital XOR gate to them. A base station could also try both methods, if appropriate or if desired.

When two signals are to be used to decode an uplink transmission, they can be combined in the analogue domain, e.g. by adding the soft bits, or in the digital domain. This teaching applies whether they have been obtained directly (e.g. A from the UE and A from the relay node) or indirectly (e.g. A from the UE and A from the combination of B from another UE and of A⊕B from the relay node). In case the analogue domain is used, they can be combined by adding the soft bits, thereby obtaining one analogue signal that can then be processed conventionally. The power and SNR should thereby be improved and the chances of a successful decoding can thus be increased. In the case of the digital domain, the two signals may be converted into the digital domain conventionally, e.g. in the same way as any other incoming uplink signals received at the base station, and then the base station can attempt to process each of the two signals in the usual manner to try to obtain a positive CRC check. This would give the base station two attempts at decoding the transmission, using signals obtained via two different routes.

It is noteworthy that in some examples, the base station can use the signals it receives from the terminal and from the relay node as it believes is best. For example, if the base station can detect that the signals received from the terminal have not arrived, or have arrived with a very poor quality, it can ignore these signals and rely on the transmission from the relay node only. In other cases, for example where the terminal's and relay node's transmissions are added in the analogue domain (e.g. by adding the soft bits), the poor quality signal can still be added to the other one if appropriate or desired. The base station can also combine them giving them a weight so as to give some transmission more weight or importance in the decoding of the uplink transmissions. It may for example give more weight to the relay node transmissions assuming that they are more likely to be correct due to a smaller terminal-relay node distance than a terminal-base station distance for example. The weight may be based, for example (but not exclusively), on distance between different nodes in a transmission path, quality link, type of node (e.g. transmissions from a relay node may be given a larger weight), power received, etc. The example mentioned above where one of the two corresponding transmissions from the relay node and from the terminal is ignored can be seen as an example case of a weighted combination where this transmission has been given the weight zero.

While the decision to change the mode of operation of an infrastructure unit may be made by any network unit, such as a dedicated interference optimising unit, for example for an area including one or more macrocell, it may also be made at a base station. The base station may thus include the interference optimising features of the present disclosure and may be configured to activate, deactivate or re-configure small cell base stations and/or relay nodes in its range or allocated control area. For example, such a base station can be seen as a master base station and the controlled base stations or relay nodes can be seen as slave nodes of the master base station. In another example, such a network unit may be configured to control interference over an area corresponding to two or more base stations, such as two or more macrocell base stations. For example, while a relay may not be causing an interference problem for terminals served by the macrocell base station that is overseeing, or controlling, the relay node, it may be creating an interference problem for terminals served by another neighbouring macrocell. In this case, the base station may not be operable to control the relay node and would thus not be able to reduce the level of interference. On the other hand, if a network unit in accordance with the present disclosure and overseeing the two macrocell base stations is provided, such a network unit would be able to detect that the relay node is causing interference and would be able to for example reconfigure the relay node as an uplink only relay node. It is clear that the same teachings apply if instead of a relay node, a base station such as a small cell base station, is causing the interference. The instructions to reconfigure the relevant infrastructure unit may be sent in any appropriate manner, for example over a wired, wireless or mixed transmissions path, and via one or more other infrastructure units if appropriate (e.g. via a base station).

When the relay node is transmitting uplink data to the base station based on uplink data sent from a terminal, the relay may in some cases simply forward to the data without making any modifications or without processing it in any way. In other cases, the relay node may decode the data received from the terminal, for example to confirm that the data's integrity has not been compromised by determining whether a positive CRC check can be obtained, and then only forward and optionally process the data. If for example the data cannot be decoded (which can for example include cases where the data was not received), the relay node may be configured to report to the base station that the uplink data could not successfully receive the data from the terminal rather than transmit relayed data. If on the other hand the data could be successfully decoded, the uplink-only relay node can either forward the data without processing it further, or can process it (e.g. to carry out a XOR operation or to add redundancy or any other suitable data processing operation) before forwarding it to the base station.

In the present disclosure, the term infrastructure unit aims to refer to any network node in the radio access network which can be found on the part from a source terminal (excluded) to a base station (included). It is noteworthy that although conventional terminals operating in a legacy network are unlikely to be considered as an infrastructure unit, in some examples (e.g. in some D2D cases), a terminal may sometimes be considered as an infrastructure unit, for example if it relays data or transmissions from other terminals to a base station (directly or indirectly). This term can thus include a base station for a macrocell, a base station for a small cell, a femtocell, a picocell, a relay node (operating in uplink and/or downlink), a terminal providing connectivity to one or more further terminals, etc.

As used herein, transmitting information or a message to an element may involve sending one or more messages to the element and may involve sending part of the information separately from the rest of the information. The number of "messages" involved may also vary depending on the layer or granularity considered.

In accordance with the present disclosure, when an uplink only relay node relays uplink signals, it may transmit relayed signals to the base station via one or more nodes (where the relayed signals are based on the received first uplink signals). For example, the signals may be transmitted to the base station via one or more relay nodes where some or all of them may be operating in one of an uplink-only mode or an uplink-and-downlink mode.

It is noteworthy that even though the present disclosure has been discussed in the context of LTE, its teachings are applicable to but not limited to LTE or to other 3GPP standards. In particular, even though the terminology used herein is generally the same or similar to that of the LTE standards, the teachings are not limited to the present version of LTE and could apply equally to any appropriate arrangement not based on LTE and/or compliant with any other future version of an LTE or 3GPP or other standard.

Various further aspects and features of the present technique are defined in the appended claims. Various modifications may be made to the embodiments hereinbefore described within the scope of the appended claims. For example although LTE has been presented as an example application, it will be appreciated that other mobile communications systems can be used for which the present technique can be used.

The following numbered clauses define various further aspects and features of the present technique:

Clause 1. A method of reducing interference in a mobile communications network, wherein the mobile network comprises one or more infrastructure units and one or more terminals, the infrastructure units being operable to send and/or receive wireless signals with the one or more terminals and the method comprising:
  estimating an interference level in the mobile communication network;
  in the event that the interference level is detected as being above a satisfactory threshold:
    selecting an infrastructure unit of the one or more infrastructure units which is currently operating as one of a base station or an uplink and downlink relay node configured to relay uplink and downlink transmissions, and
    configuring the infrastructure unit to operate as an uplink relay node such that it does not send downlink signals; and
  in the event that the interference level is detected as being below a satisfactory threshold:
    selecting an infrastructure unit currently operating as an uplink relay node such that it does not send downlink signals, and
    configuring the infrastructure unit to operate as one of a base station or an uplink and downlink relay node configured to relay uplink and downlink transmissions.

Clause 2. A network unit for reducing interference in a mobile communications network, wherein the mobile network comprises one or more infrastructure units and one or more terminals, the infrastructure units being operable to send and/or receive wireless signals with the one or more terminals and the network unit, the network unit being configured to:
  estimate an interference level in the mobile communication network;
  in the event that the interference level is detected as being above a satisfactory threshold:
    select an infrastructure unit of the one or more infrastructure units which is currently operating as one of a base station or an uplink and downlink relay node configured to relay uplink and downlink transmissions, and
    configure the infrastructure unit to operate as an uplink relay node such that it does not send downlink signals; and
  in the event that the interference level is detected as being below a satisfactory threshold:
    select an infrastructure unit currently operating as an uplink relay node such that it does not send downlink signals, and
    configure the infrastructure unit to operate as one of a base station or an uplink and downlink relay node configured to relay uplink and downlink transmissions.

Clause 3. Circuitry for a network unit for reducing interference in a mobile communications network, wherein the mobile network comprises one or more infrastructure units and one or more terminals, the infrastructure units being operable to send and/or receive wireless signals with the one or more terminals and the network unit, wherein the circuitry comprises a controller element and a transceiver element configured to operate together to:
  estimate an interference level in the mobile communication network;

in the event that the interference level is detected as being above a satisfactory threshold:
  select an infrastructure unit of the one or more infrastructure units which is currently operating as one of a base station or an uplink and downlink relay node configured to relay uplink and downlink transmissions, and
  configure the infrastructure unit to operate as an uplink relay node such that it does not send downlink signals; and
in the event that the interference level is detected as being below a satisfactory threshold:
  select an infrastructure unit currently operating as an uplink relay node such that it does not send downlink signals, and
  configure the infrastructure unit to operate as one of a base station or an uplink and downlink relay node configured to relay uplink and downlink transmissions.

Clause 4. A method of operating an infrastructure unit in a mobile communications network, wherein the mobile network comprises a base station and one or more terminals in communications with the base station, the method comprising the infrastructure unit:
  being configured not to send downlink signals to the one or more terminals;
  receiving an indicator of a first uplink resource grant for a first terminal of the one or more terminals;
  receiving first uplink signals sent by the first terminal to the base station, wherein the first uplink signals are sent via resources allocated via the first uplink resource grant;
  transmitting relayed signals to the base station, wherein the relayed signals are based on the received first uplink signals.

Clause 5. A method according to Clause 4, further comprising the infrastructure unit amplifying the received uplink signals before transmitting the relayed signals.

Clause 6. A method according to Clause 4 or Clause 5, further comprising the infrastructure unit:
  decoding the uplink transmissions corresponding to the received uplink signals; and
  generating the relayed signals based on the decoded uplink transmissions.

Clause 7. A method according to any of Clause 4 to Clause 6, comprising the infrastructure unit:
  receiving an indicator of a second uplink resource grant for the first terminal;
  receiving second uplink signals sent by the first terminal to the base station, wherein the second uplink signals are sent via resources allocated via the second uplink resource grant
  combining the first uplink signals with the second uplink signals thereby generating combined uplink signals wherein the relayed signal is based on the combined uplink signals.

Clause 8. A method according to any of Clause 4 to Clause 7, comprising the infrastructure unit:
  receiving an indicator of a further uplink resource grant for a second terminal of the one or more terminals;
  receiving further uplink signals sent by the second terminal to the base station, wherein the further uplink signals are sent via resources allocated via the further uplink resource grant
  combining the first uplink signals with the further uplink signals thereby generating combined uplink signals wherein the relayed signal is based on the combined uplink signals.

Clause 9. An infrastructure unit in a mobile communications network, wherein the mobile network comprises a base station and one or more terminals, the infrastructure unit being configured to operate in an uplink relay mode, wherein, in the uplink relay mode the infrastructure unit is configured to:
  relay transmissions between the base station and a first terminal of the one or more terminals;
  not send downlink signals to the one or more terminals;
  receive an indicator of a first uplink resource grant for the first terminal;
  receive first uplink signals sent by the first terminal to the base station, wherein the first uplink signals are sent via resources allocated via the first uplink resource grant; and
  transmit relayed signals to the base station, wherein the relayed signals are based on the received first uplink signals.

Clause 10. An infrastructure unit according to Clause 9 wherein the infrastructure unit is further configured to operate in a base station mode.

Clause 11. An infrastructure unit according to Clause 9 or Clause 10 wherein the infrastructure unit is further configured to operate in an uplink and downlink relay mode.

Clause 12. Circuitry for a infrastructure unit in a mobile communications system, wherein the circuitry comprises a controller element and a transceiver element configured to operate together to:
  relay transmissions between the base station and a first terminal of the one or more terminals;
  not send downlink signals to the one or more terminals;
  receive an indicator of a first uplink resource grant for the first terminal;
  receive first uplink signals sent by the first terminal to the base station, wherein the first uplink signals are sent via resources allocated via the first uplink resource grant; and
  transmit relayed signals to the base station, wherein the relayed signals are based on the received first uplink signals.

Clause 13. A method of operating a base station in a mobile communications network, wherein the mobile network comprises the base station, one or more terminals and a relay node configured to relay transmissions between the base station and a terminal of the one or more terminals, the method comprising the base station:
  sending a first resource grant for the first terminal, the first resource grant allocating first uplink resources to the first terminal;
  sending first grant information to the relay node, the first grant information including an indication of the allocated first uplink resources for the first terminal;
  receiving first uplink signals via the allocated first uplink resources;
  receiving first relayed uplink signals transmitted by the relay node to the base station; and
  decoding uplink transmissions for the first terminal using the first uplink signals and the first relayed uplink signals.

Clause 14. A method according to Clause 13, the method comprising the base station:
  sending a second resource grant for the first terminal, the second resource grant allocating second uplink resources to the first terminal;
  sending second grant information to the relay node, the second grant information including an indication of the allocated second uplink resources for the first terminal; and
  receiving second uplink signals sent via the second uplink resources;
wherein decoding uplink transmissions for the first terminal comprises combining the second uplink signals and the first relayed uplink signals.

Clause 15. A method according to Clause 13 or Clause 14, the method comprising the base station:

sending a second resource grant for a second terminal of the one or more terminals, the second resource grant allocating second uplink resources to the second terminal;

sending second grant information to the relay node, the second grant information including an indication of the allocated second uplink resources for the first terminal; and receiving second uplink signals sent via the second uplink resources;

wherein decoding uplink transmissions for the first terminal comprises combining the second uplink signals and the first relayed uplink signals.

Clause 16. A base station for use in a mobile communications network, wherein the mobile network comprises the base station, one or more terminals and a relay node configured to relay transmissions between the base station and a terminal of the one or more terminals, wherein the base station is configured to:

send a first resource grant for the first terminal, the first resource grant allocating first uplink resources to the first terminal;

send first grant information to the relay node, the first grant information including an indication of the allocated first uplink resources for the first terminal;

receive first uplink signals via the allocated first uplink resources;

receive first relayed uplink signals transmitted by the relay node to the base station; and decode uplink transmissions for the first terminal using the first uplink signals and the first relayed uplink signals.

Clause 17. Circuitry for a base station for use in a mobile communications network, wherein the mobile network comprises the base station, one or more terminals and a relay node configured to relay transmissions between the base station and a terminal of the one or more terminals, wherein the circuitry comprises a controller element and a transceiver element configured to operate together to:

send a first resource grant for the first terminal, the first resource grant allocating first uplink resources to the first terminal;

send first grant information to the relay node, the first grant information including an indication of the allocated first uplink resources for the first terminal;

receive first uplink signals via the allocated first uplink resources;

receive first relayed uplink signals transmitted by the relay node to the base station; and decode uplink transmissions for the first terminal using the first uplink signals and the first relayed uplink signals.

Clause 18. Computer software which, when executed by a computer, causes the computer to perform the method of Clause 1, 4-8 or 13-15.

Clause 19. A storage medium which stores computer software according to Clause 18.

Clause 20. Any preceding clause wherein the mobile node and the terminal are operable to communicate via the wireless interface using at least one of: a 3GPP communication protocol, an LTE communication protocol, a 4G communication protocol and a 5G communication.

REFERENCES

[1] Holma H. and Toskala A., "LTE for UMTS OFDMA and SC-FDMA Based Radio Access", John Wiley & Sons Limited, January 2010.

[2] TR 36.872, Small cell enhancements for E-UTRA and E-UTRAN—Physical layer aspects, V12.1.0 (2013-12)

The invention claimed is:

1. A method of reducing interference in a mobile communications network, wherein the mobile communications network comprises one or more infrastructure devices and one or more terminals: the infrastructure devices being configured to send and/or receive wireless signals with the one or more terminals, the method comprising:

estimating an interference level in the mobile communication network;

in the event that the interference level is detected as being above a satisfactory threshold:

selecting an infrastructure device of the one or more infrastructure devices which is currently serving the one or more terminals as one of a base station or an uplink and downlink relay node configured to relay uplink and downlink transmissions from and to the one or more terminals, and configuring the infrastructure device to serve the one or more terminals as an uplink relay node such that it relays uplink transmissions from the one or more terminals and does not send downlink signals to the one or more terminals;

in the event that the interference level is detected as being below a satisfactory threshold:

selecting an infrastructure device currently serving the one or more terminals as an uplink relay node such that it relays uplink transmissions from the one or more terminals and does not send downlink signals to the one or more terminals, and configuring the infrastructure device to serve the one or more terminals as one of a base station or an uplink and downlink relay node configured to relay uplink and downlink transmissions from and to the one or more terminals;

receiving, by an infrastructure device serving the one or more terminals as an uplink relay node, an indicator of a first uplink resource grant for the one or more terminals and an indicator of a second uplink resource grant for the one or more terminals;

receiving, by the infrastructure device, first uplink signals from the one or more terminals, wherein the first uplink signals are sent via resources allocated via the first uplink resource grant;

receiving, by the infrastructure device, second uplink signals sent by the one or more terminals, wherein the second uplink signals are sent via resources allocated via the second uplink resource grant; and combining, by the infrastructure device, the first uplink signals with the second uplink signals to generate combined uplink signals by performing network coding, wherein the relayed signal is based on the combined uplink signals.

2. The method of claim 1, further comprising:

amplifying, by the infrastructure device, the received first uplink signals before transmitting the relayed signals.

3. The method of claim 1, further comprising:

decoding, by the infrastructure device, the received first uplink signals; and generating, by the infrastructure device, the relayed signals based on the decoded first uplink signals.

4. A network element configured to reduce interference in a mobile communications network, wherein the mobile communications network comprises a relay node and a terminal, the network element comprising:

circuitry configured to estimate an interference level in the mobile communication network;

control the relay node to serve the terminal as an uplink relay node such that it relays uplink transmissions from the terminal to a base station and does not send downlink signals to the terminal in a case that the estimated interference level is above a threshold value;

control the relay node to serve the terminal as an uplink and downlink relay node to relay uplink and downlink signals from and to the terminal in a case that the estimated interference level is below the threshold value; and control the relay serving the one or more terminals as an uplink relay node to receive an indicator of a first uplink resource grant for the one or more terminals and an indicator of a second uplink resource grant for the one or more terminals;

receive first uplink signals from the one or more terminals, wherein the first uplink signals are sent via resources allocated via the first uplink resource grant;

receive second uplink signals sent by the one or more terminals, wherein the second uplink signals are sent via resources allocated via the second uplink resource grant; and combine the first uplink signals with the second uplink signals to generate combined uplink signals by performing network coding, wherein the relayed signal is based on the combined uplink signals.

5. The network element of claim 4, wherein
the circuitry is further configured to control the relay node to switch from operating as the uplink relay node to operating as the uplink and downlink relay node in the case that the estimated interference level is below the threshold value.

6. The network element of claim 4, wherein
the circuitry is further configured to control the relay node to switch from operating as the uplink and downlink relay node to operating as the uplink relay node in the case that the estimated interference level is above the threshold value.

7. The network element of claim 4, wherein
the network element is the base station.

* * * * *